INVENTORS
WILLIAM F. BADER
ARNEY LANDY, JR.
MARVIN J. SCHMITZ
BY Carpenter, Kinney & Coulter
ATTORNEYS INVENTORS
WILLIAM F. BADER
ARNEY LANDY, JR.
MARVIN J. SCHMITZ
BY
Carpenter, Kinney & Coulter
ATTORNEYS

ELECTROCARDIOGRAPHIC RECORDING SYSTEM

Filed Oct. 20, 1967 Sheet 3 of 6

INVENTORS
WILLIAM F. BADER
ARNEY LANDY, JR.
MARVIN J. SCHMITZ
BY Carpenter, Kinney & Coulter
ATTORNEYS INVENTORS
WILLIAM F. BADER
ARNEY LANDY, JR.
MARVIN J. SCHMITZ
BY
Carpenter, Kinney & Coulter
ATTORNEYS

ELECTROCARDIOGRAPHIC RECORDING SYSTEM

INVENTORS
WILLIAM F. BADER
ARNEY LANDY, JR.
MARVIN J. SCHMITZ
BY
Carpenter, Kinney & Coulter
ATTORNEYS INVENTORS
WILLIAM F. BADER
ARNEY LANDY, JR.
MARVIN J. SCHMITZ
BY Carpenter, Kinney & Coulter
ATTORNEYS United States Patent Office 3,434,151

Patented Mar. 18, 1969

3,434,151

ELECTROCARDIOGRAPHIC RECORDING SYSTEM

William F. Bader, Maplewood Village, and Arney Landy, Jr., Roseville Village, Minn., and Marvin J. Schmitz, North Hudson Village Wis., assignors to Minnesota Mining and Manufacturing Company, St. Paul, Minn., a corporation of Delaware Filed Oct. 20, 1967, Ser. No. 676,860

U.S. Cl. 346—1 13 Claims

Int. Cl. G01d *9/40, 9/10*

ABSTRACT OF THE DISCLOSURE

An electrocardiographic recording system is disclosed wherein a source of electrocardiographic signals are simultaneously connected as an input to a multiplexing circuit which generates a composite time division output signal for controlling a waveform generating means, such as a plurality of cathode ray tubes, to produce electrocardiographic waveforms dervied from the composite time division output signals for exposing a photographic media to make a permanent record of the electrocardiographic waveforms.

Photographing of electrocardiographic waveforms from cathode ray tubes is known in the art. For example, an article entitled Design of a Centralized Electrocardiographic and Vectorcardiographic System appearing in the American Journal of Cardiology in volume 19, No. 6, pages 818–826 described one known system. Briefly, the electrocardiographic recording system described in the article utilizes a Standard System of twelve scalar leads. Information from the twelve leads is transmitted by either a single channel or up to six multiple simultaneous channels to an electrocardiographic recording system. The centralized electrocardiographic recording system utilizes two high resolution 17-inch oscilloscope tubes. One oscilloscope tube is utilized as the monitor tube while the other tube is used as a slave recording tube. A multiplexing system is connected between the input channels and the oscilloscope tubes. The multiplexing system converts the received simultaneous channels of information into a time division output signal. Thereafter the various electrocardiographic waveforms are reassembled and reproduced on both the monitor and slave oscilloscope tubes. A recording camera photographs the electrocardiographic wave forms from the slave oscilloscope onto one quadrant of a 35 mm. frame in an aperture card.

The prior art systems including the system described in the above-noted article have several inherent disadvantages. In particular, in the above-described system large oscilloscope tubes are used for the monitor and recording tubes. Thus, since large oscilloscope tubes are utilized, the operating characteristics of the multiplexing circuitry, such as for example the circuitry multiplexing rate, are determined by whether the large tube includes a single or multiple beam source.

Another attendant disadvantage of using a large oscilloscope tube is that the overall physical dimensions of the tube limits the compactness of the recording system and location of the tubes withing the system. Because of the large physical size of the tube face which is to be photographed by the camera processor unit, a large spacing is required between the tube face and the camera lens. Since a large distance is required between the tube face and the lens, the lens must emit a fairly bright light pattern since the light energy between the tube face and the camera lens decreases as a result of the distance therebetween. When an oscilloscope tube is required to emit a fairly bright light pattern, the tube life expectancy is seriously shortened. One other associated disadvantage of photographing a light pattern from a tube face of a large oscilloscope tube is that the amount of information which a large tube can display is limited by the frequency respnse (slow rate) of the oscilloscope tube. In large oscilloscope tubes, the full scale frequency response is lower than that of smaller cathode ray tubes.

The 35 mm. frame in an aperture card is capable of recording information in four quadrants. In the system described in the above-noted article, the electrocardiographic waveforms appearing on the face of the large record oscilloscope is recorded in one of the four quadrants. If information was to be recrded simultaneously in four quadrants from four large oscilloscope tubes, the four tubes would need to be positioned in a rectangular arrangement so that the same could be photographed. By using four relatively large oscilloscope tubes, compactness of any recording system is seriously limited due to bulkiness of large oscilloscope tubes.

One other inherent disadvantage of the prior art systems is that means are not provided for calibrating the system prior to transmission of that patient's electrocardiographic signals. In the absence of adequate calibration, specialists such as cardiologists who interpret the transmitted data, do not have a calibration waveform for comparison purposes. Further, if the recording system is utilized as a computer input device, the computer is not provided with a calibration reference level for computing functions. Since the relative magnitudes of peaks of electrocardiographic waveforms are crucial, a cardiologist or a computerized diagnosis system, without a calibrated reference level, is unable to give much weight or creditability to the electrocardiographic data.

The present invention overcomes several disadvantages inherently associated with the prior art systems. In particular, the present system utilizes standard twelve lead scalar equipment normally found in hospitals and clinics. Further, by a slight modification of the standard equipment, a calibration circuit can be added. The calibration circuit, when actuated, transmits a calibration signal over the transmission link, to the centralized recording system. The calibration signal is processed and displayed and photographed together with the electrocardiographic waveforms thereby providing a calibration reference label.

Another advantage of the present system is that a plurality of single beam cathode ray tubes are utilized as both the monitor and record cathode ray tubes. By using a plurality of cathode ray tubes, each of which display a few of the complete set of electrocardiographic waveforms, higher resolution images and sharper images are obtained using lower intensity or light levels. Further, use of a plurality of cathode ray tubes eliminates the requirement that an electron beam be deflected over a relatively large angle. By reducing the deflection of the electron beam in a cathode ray tube, the distortion on the image for photographing purposes is greatly reduced.

One other advantage of using a plurality of small cathode ray tubes for the recording cathode ray tubes is that four quadrants of information can be recorded simultaneously by a camera processor unit with each of the tubes being physically located relatively close to the camera lens.

These and other advantages of the present invention will become more apparent when considered in light of the following described embodiment taken together with the drawing wherein.

Figure 9:
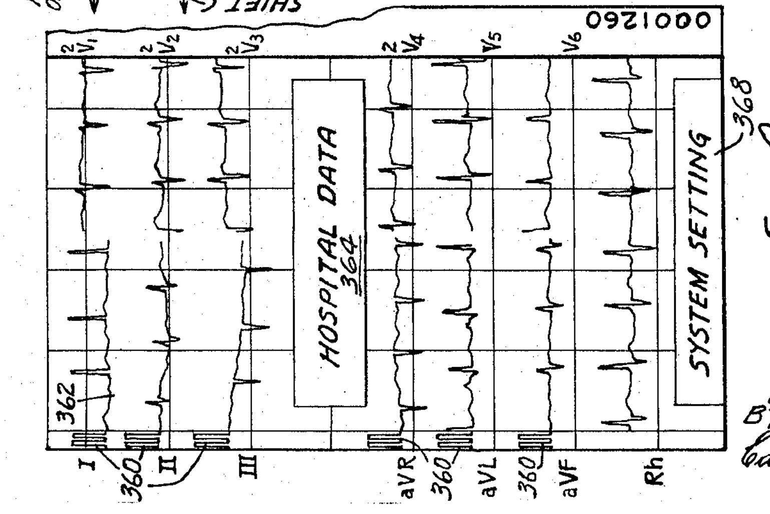
Figures 8A, 8B:
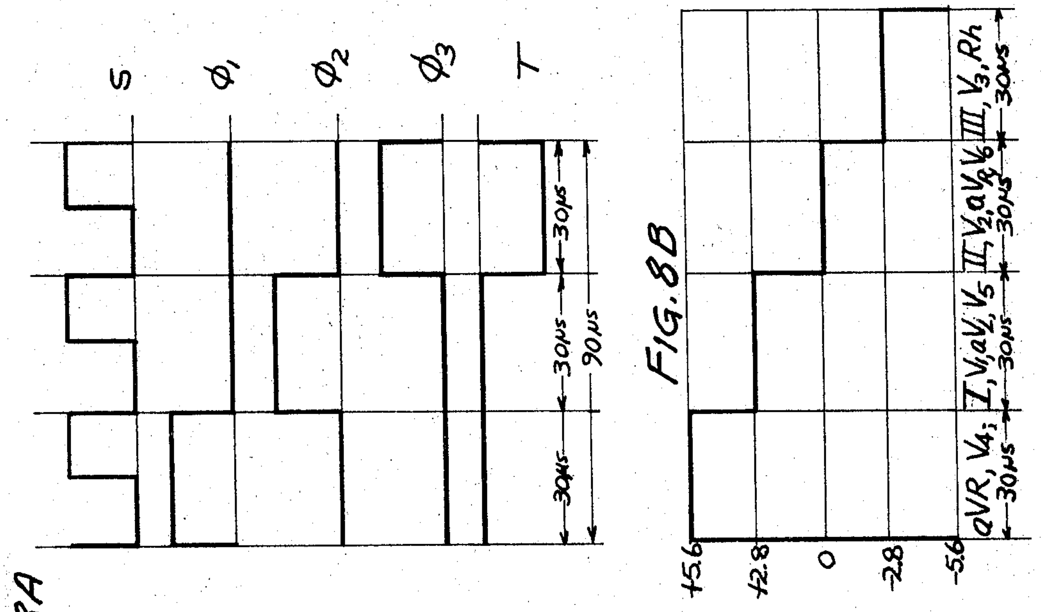

FIGURES 8A and 8B are graphs illustrating waveforms of the various clocking signals from the multiphase clock and of reference signals from a reference multiplexer respectively; and FIGURE 9 is a pictorial representation of a typical electrocardiographic waveform which appears on the record cathode ray tubes and which is subsequently photographed on an aperture card showing the calibration waveforms, the twelve electrocardiographic waveforms and a rhythm waveform.

Briefly, the electrocardiographic system of the present invention is capable of displaying analog electrocardiographic signals as electrocardiographic waveforms. In one embodiment, a photographing means is utilized to image a photographic media with the electrocardiographic waveforms. The system includes a plurality of electrical channels each of which contain an analog electrocardiographic signal representing an electrocardiographic waveform. Input means are provided which are operatively coupled to each of the electrical channels. The input means will simultaneously amplify the electrocardiographic signals received from the electrical channels. A signal multiplexing means, which is operatively coupled to the input means simultaneously receives each of the amplified electrocardiographic signals and in response to clocking signals produces a time division output signal. The time division output signal comprises a predetermined number of equal time increments each of which contain electrocardiographic signal information from different electrocardiographic waveforms. A clocking means including a multiphase clock is operatively coupled to the signal multiplexing means. The multiphase clock produces a plurality of clocking signals having a predetermined frequency but different preselected phases. The clocking signals are utilized for controlling the signal multiplexing means. A reference signal mutliplexing means, which is operatively coupled to the clocking means, is responsive to the clocking signals for producing a plurality of reference multiplexing signals each of which represent a different discrete waveform section of different electrocardiographic waveforms. A summing means is operatively coupled to the signal multiplexing means and the reference signal multiplexing means. The summing means sums the time division output signal from the signal multiplexing means with the reference multiplexing signals from the reference signal multiplexing means. The output of the summing means contains a composite time division output signal on a single channel wherein each time increment electrocardiographic signal information is programmed with a predetermined waveform section. A sweep generating means is provided for generating sweep signals which represent the time base for the electrocardiographic waveform. The waveform generating means is responsive to the opposite time division output signal and to the sweep signals for displaying a plurality of electrocardiographic waveforms each of which have an amplitude determined by the time increment electrocardiographic signal information and the time base of which is determined by the sweep signals. The waveform generating means generates and displays each waveform section from the composite time division output signal whereby each waveform section results in a plurality of separate electrocardiographic waveforms wherein each waveform represents electrocardiographic signals from a selected channel.

Figure 1:
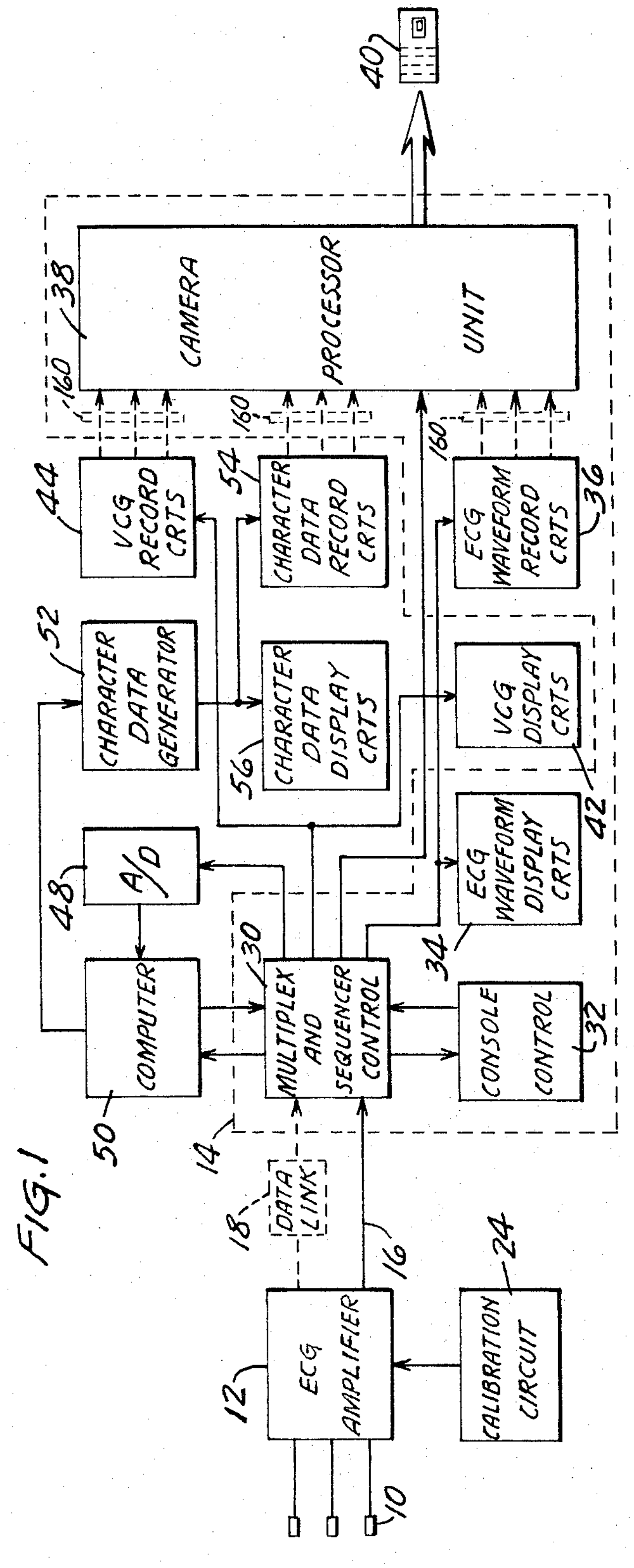
FIGURE 1 is a block diagram of an electrocardiographic and vectorcardiographic recording and computer diagnosis system utilizing the teachings of the present invention.

The block diagram of FIGURE 1 represents a computerized electrocardiographic (ECG) and vectorcardiographic (VCG) recording and diagnosis system. The use of ECG signals and ECG waveforms is meant to be a broad term which includes any graphs, curves, signals or waveforms which relates to or which are taken for diagnosis of a cardiovascular system.

Standard electrodes, generally designated as 10, of a standard twelve lead electrocardiograph are attached to a patient whose ECG is to be recorded and/or analyzed. A standard ECG cart comprising an ECG amplifier 12, such as for example a Sanborn ECG amplifier Model No. 1509A, is capable of simultaneously transmitting 1, 3 or 6 channels of the 12 channels of ECG signals. The amplifier is then selectively switched to transmit the remaining channels in a desired sequence. Any one of the 12 leads can be selected as a rhythm lead.

Normally the 12 scalar leads plus rhythm of an ECG amplifier are designated in the following scheme: I, II, III, *a*VR, *a*VL, *a*VF, $V_1$, $V_2$, $V_3$, $V_4$, $V_5$, $V_6$ and R*h*. A standard ECG amplifier has a capacitor input with a response from .05–1000 Hertz (Hz.) and is responsive to a typical 1 millivolt (mv.) input signal to produce a 1 volt output signal. By use of a capacitor input, the normal D.C. level of the body is prevented from being applied to the amplifier.

The output of the ECG amplifier 12 is applied to the ECG recording system, generally designated as 14, via either a direct channel 16 or alternatively by means of a data link 18. The data link may include, for example, a "Data-Phone" data transmitter, a telephone line and a "Data-Phone" data receiver. The direct channel 16 is used when the separation between the amplifier 12 and the recording system 14 is in the order of 100 feet.

For relatively large separations between the amplifier 12 and recording systems 14, a data link 18 is used. Typically, a data link is used between a room in a hospital and a centralized laboratory area or between a hospital and a recording system located in different cities. The data transmitter may be an AT&T "Data-Phone" set Model 604A having a 3 channel transmitting capability. The data receiver may be an AT&T "Data-Phone" set Model 604B having a 3 channel receiving capability. Also, it is anticipated that other analog transmitting and receiving systems or apparatus may be used other than the above devices. In general, the transmitting and receiving units should have a 1 volt input/output capability and be able to transmit analog ECG signals with relatively little distortion. Typical frequency response of a preferred system may be from D.C. to 100 Hz. with a 3 db level at the 100 Hz. frequency.

The standard ECG amplifier 12 may be slightly modified by the addition of a calibration circuit 24. The calibration circuit 24 is operatively connected across the same inputs as the electrodes 10 from a patient's body. The calibration circuit 24 generates and applies a calibration signal to the inputs of the ECG amplifier 12. In one embodiment, the calibration circuit 24 generated a 1 mv. square wave having a frequency of 10 Hz. Typically, a 1 mv. input to the ECG amplifier 12 results in a 1 volt output. The 1 volt output from the amplifier 12 is transmitted by either the direct channel 16 or the data link 18 to the recording system 14. The calibration signal is passed through the recording system circuitry and ultimately deflects the electron beam in each of the cathode ray tubes (CRT's) a distance equal to a 1 mv. input to the ECG amplifier 12 from a patient. Thus, subsequent ECG signals from a patient which are displayed as ECG waveforms on the CRT's have calibration waveforms of a known amplitude for reference purposes.

In the preferred embodiment, the recording system 14 includes the circuitry enclosed within the dashed box. Such a recording system 14 includes a multiplex and sequencer control 30, a console control 32, ECG waveform display CRT's 34, ECG record CRT's 36 and a camera processor unit 38. The camera processor unit 38, in one embodiment, is selected to be a modified 3M2000 film sort processor camera sold by Minnesota Mining and Manufacturing Company of St. Paul, Minn. This processor camera is capable of recording the standard 12 ECG waveforms and a rhythm waveform on one quadrant of a 35 mm. aperture card 40.

The multiplex and sequencer control 30 is capable of simultaneously receiving ECG signals over up to 6 channels. The console control 32 programs the multiplex and sequencer control 30 to process the received ECG signals in either 1, 3 or 6 channels simultaneously. After an operator has programmed the console control 32 for operation, the selected number of channels of ECG signals is multiplexed into a time division multiplex signal. The multiplex signal is subsequently applied to the ECG waveform display and record CRT's 34 and 36 in a programmed sequence. Each of the CRT's 34 and 36 simultaneously display the selected number of ECG waveforms. The camera processor unit 38 is then actuated by the multiplex and sequencer control 30 to photograph the waveforms. If one channel of ECG signals is to be recorded in each operation, the camera processor unit 38 will make 14 exposures. The first exposure would be one for the calibration signal, the next 12 exposures for the individual channels and the 14th for the rhythm channel. The camera processor unit 38, upon completing a record cycle, dispenses an aperture card 40 which contains on one quadrant thereof a permanent ECG photographic record.

The ECG amplifier 12 can be equipped with a VCG summing circuitry as well as the standard lead networks. For example, a Frank system having a VCG amplifier which provides 3 VCG signals normally designated as $V_x$, $V_y$ and $V_z$ can be added to the ECG amplifier 12. The Frank system requires 5 electrodes, some of which are duplicates for the normal ECG waveforms, bringing the total to 15 electrodes. The VCG signals developed by the Frank system can be transmitted over the same channel 16 or data link 18 as the ECG signals to the multiplexer and sequencer control 30. A separate set of VCG display CRT's 42 and a separate set of VCG record CRT's 44 are used to display the VCG waveforms. The VCG waveforms appearing on record CRT 44 can be recorded by the same camera processor unit 38 on a different quadrant of the 35 mm. microfilm in the aperture card 40.

The recording system 14 can be adapted as an input/output device for a computer controlled ECG diagnosis system. Since the multiplex and sequencer control 30 received the ECG and VCG signals in an analog format, an A/D converter 48 connected between the multiplex and sequencer control 30 converts the analog signals into digital signals and applies the digital signals to a computer 50. Also, the computer may be interconnected with the multiplex and sequencer control 30 for control purposes. The output from the computer 50 can be applied in digital format to a character/data generator 52. The generator 52 converts the computer information into electrical signals of alpha-numeric representation. The character/data generator 52 is an input to character/data record CRT's 54 and character/data display CRT's 56. The character/data record CRT's 54 can have the alpha-numeric data displayed thereon to record on a different quadrant of the 35 mm. photographic media of the aperture card 40 by means of the camera processor unit 38. The character/data display CRT's 56 display the alpha-numeric information from the computer 50 to the operator at the console control 32.

A typical computer 50 may be a Control Data 160A computer utilizing the ECG pattern recognition program currently under development by the United States Public Health. The output information from the computer 50 may include the tabulation of the various peaks on ECG waveforms together with a computer diagnosis of the ECG signals applied to the computer through the A/D converter 48.

Figure 2:
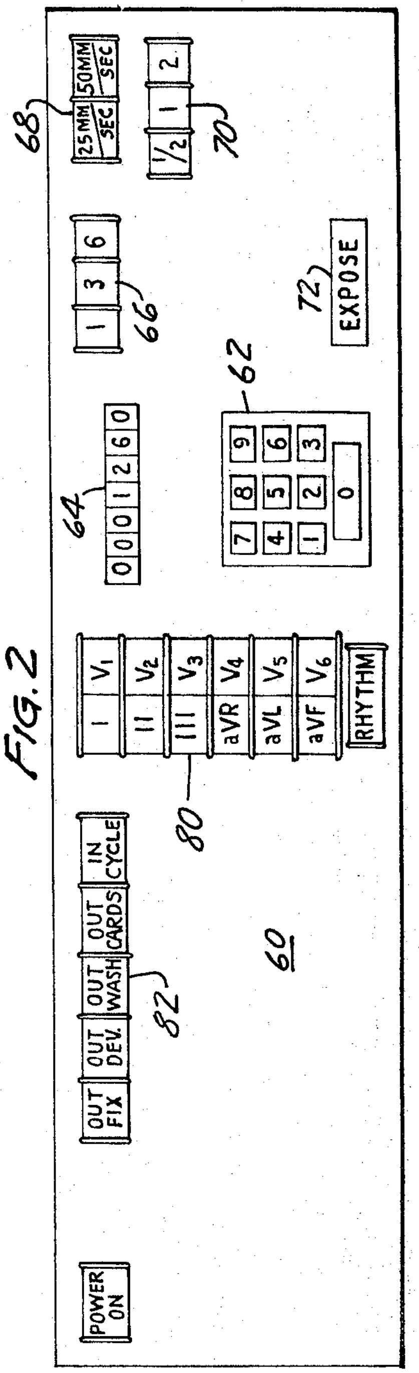
FIGURE 2 is a pictorial representation of the console keyboard of the recording portion of the electrocardiographic system of FIGURE 1.

Considering now only the ECG recording system 14, FIGURE 2 illustrates the keyboard 60 for the console control 32 for programming the multiplex and sequencer control 30. When ECG signals are to be recorded by the recording system 14, an operator selects any one of a plurality of modes of operation. Typically, a patient identification number is entered into the multiplexer and sequencer control 30 by means of numerical keys 62 on the keyboard 60. The entered patient number is displayed on a patient number indicator 64 and on a patient number indicator within the machine adjacent to the ECG record CRT's 36. The patient number is photographed by the camera processor unit 38 to permanently identify the patient with the final permanent record. Thereafter, one or a number of ECG waveforms can be recorded simultaneously by actuating one of the lead group selector switches 66. As illustrated on keyboard 60, a single channel, 3 channels or 6 channels of ECG signals can be processed and photographed simultaneously. Also, an operator selects the time base or sweep rate for waveforms by means of sweep control switches 68. Typical sweep controls are 25 mm./sec. or 50 mm./sec. with 25 mm./sec. being normally selected. Also, the amplitude of the recorded waveform is selected by gain selector switches 70. Typical gain selections include ½ mv./cm., 1 mv/cm. and 2 mv./cm. with 1 mv./cm. being most commonly used.

When a patient identification number has been entered via keys 62, a lead group selector switch 66 selected, a predetermined sweep control switch 68 selected and a gain selector switch 70 actuated, the recording system 14 is ready to record ECG waveforms on the aperture card 40. If, for example, 6 channels of ECG signals are to be simultaneously displayed and recorded, the lead group selector switch 66 having the numeral 6 is actuated. Before ECG waveforms are recorded, a calibrate waveform is transmitted and photographed. This is accomplished by actuating an expose switch 72 when a calibrate signal is transmitted from the ECG amplifier. Thereafter, the expose switch 72 is again actuated programming the camera processor unit 38 to photograph the select group of ECG waveforms, such as from the first 6 channels. Thereafter, the ECG amplifier 12 is selectively switched, at the patient location, to the other channels to transmit the remaining ECG signals to the recording system 14. The second set of 6 ECG signals is recorded by the operator actuating expose switch 72 a second time. One of the 12 ECG signals is then selected as the rhythm signal. This is accomplished by depressing any one of the channel switches 80. Actuation of one of the switches 80 selects that channel of ECG signals to be used as the rhythm channel. The expose switch 72 is then actuated a third time to record the rhythm waveform.

Thereafter, the camera processor unit controls are automatically actuated in proper sequence enabling the camera processor unit 38 to develop, fix, wash and set the 35 mm. film in an aperture card 40. Thereafter, the camera processor unit 38 dispenses an aperture card 40 which contains the 12 ECG waveforms plus the rhythm waveform. Lights 82 indicate to an operator the status of the camera processor unit 38.

Figure 3:
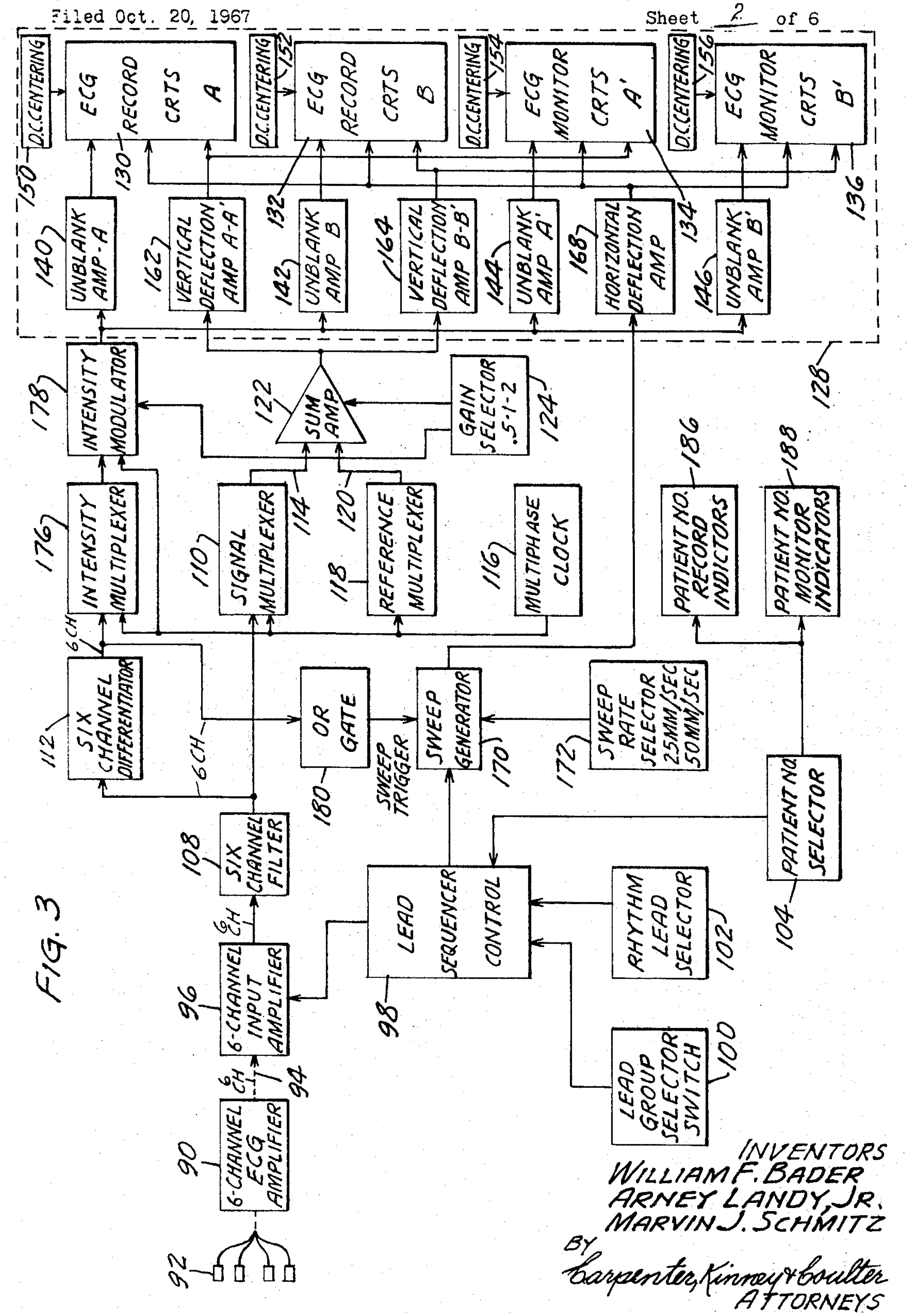
FIGURE 3 is a block diagram illustrating the various subsystems and the interconnection therebetween which form the electrocardiographic recording system.

The electrical operation of the recording system 14 can be better understood by reference to FIGURE 3. In one embodiment, a 6 channel ECG amplifier 90 receives input signals, in the millivolt (mv.) range, from electrodes 92 which are electrically connected to a patient's body. The ECG 6 channel amplifier 90 amplifies the received ECG signals and transmits 3 or 6 channels of signals via a communication link 94 to a 6 channel input amplifier 96. A lead sequencer control 98 is electrically connected to amplifier 96. The lead sequencer control 98 is responsive to the lead group selector switches 100, the rhythm lead selector switch 102 and the patient identification number selector switches 104.

After the amplifier 96 has been properly programmed by control 98, the number of channels of information to be processed by the circuitry is passed through a 6 channel filter 108 whereby the undesired noise in the ECG signals is removed therefrom. The output of the 6 channel filter 108 is simultaneously applied to a signal multiplexer 110 and to a 6 channel differentiation circuit 112. The signal multiplexer 110 upon receiving the filtered ECG signals from filter 108 converts the received information into a time division output signal which appears on output conductor 114. The number of channels to be multiplexed by the signal multiplexer 110 is programmed by the lead sequencer control 98.

Operation of the signal multiplexer 110 is controlled by a clocking means including a multiphase clock 116. Also, a reference multiplexer 118 is controlled by the multiphase clock 116 to produce reference multiplexing signals on output lead 120. The reference multiplexing signals are used to preprogram which part of the time division output signal is associated with a particular wave to be generated and recorded. The time division output signals on conductor 114 and the reference multiplexing signals on lead 120 are summed by summing means such as a summing amplifier 122. The output from the summing amplifier 122 is a composite time division output signal which is a summation of the time division output signal and reference multiplex signal. The magnitude or gain of the summing amplifier 122 is preset by means of a gain selector 124.

The composite time division output signal from summing amplifier 122 is applied to a waveform generating means generally designated by dashed box 128. The waveform generating means 128 generally includes four CRT's designated as 130–136. CRT 130 is designated as the ECG record CRT A and is used for recording certain of the ECG waveforms such as for example waveforms from leads I, II, III, $V_1$, $V_2$ and $V_3$. The CRT 132 is designated as ECG record CRT B and is used to record the remaining 6 ECG waveforms plus the rhythm waveform, namely, channels *a*VR, *a*VF, *a*VL, $V_4$, $V_5$, $V_6$ and R*h*.

CRT 134 is designated as ECG monitor CRT A′ and is a slave scope or a duplicate scope which displays exactly the same ECG waveforms appearing on CRT 130. Similarly, CRT 136 is a slave or duplicate CRT for displaying the same ECG waveforms which are to be recorded from CRT 132.

There are certain advantages to using two CRT's for recording purposes and two CRT's for monitoring purposes. For example, by using two CRT's for the record and two CRT's for the display, the required electronic circuitry for controlling two CRT's is reduced compared to that required for controlling a single, large, high resolution oscilloscope tube. Additionally, if a CRT must be replaced, it is only necessary to replace one tube of a pair rather than a complete tube. Also, by using dual record and monitor scopes, a faster sampling rate per individual waveform section, such as for example 11.7 kHz., is possible. Further, by using dual CRT's for recording purposes, it is possible to have a wider range of intensity modulation control to produce better images for photographing purposes. Further, the noise problems are reduced in that each of the tubes can be isolated from the other during operation. Additionally, the deflection voltages required for deflecting the electron beam in a small CRT are less than that required for deflecting an electron beam over a relatively large angle as required in large oscilloscope tubes.

Typically, each of the CRT's can be selected to have a physical dimension, say in the order of 4½″ x 5½″. For a record CRT, such as for example CRT's 130 and 132, a Thomas Electronics Inc. high resolution CRT Model No. 6E35P11M can be utilized. This tube is selected because it has a photographic type phosphor having a minimum to short persistence time. The monitor CRT, such as for example CRT's 134 and 136, may comprise Thomas Electronics Inc. CRT's Model No. 6E32P38M. This monitor tube is selected because it has a phosphor which has a very long persistence.

Each of the CRT's 130–136 has an unblanking amplifier 140–146 respectively. Additionally, each of the CRT's 130–136 has a D.C. centering circuit 150–156 respectively.

The position of the electron beam within the CRT's 130–136 is controlled by a vertical deflection amplifier and a horizontal deflection amplifier. Since dual record CRT's and dual monitor CRT's are employed, the number of deflection amplifiers can be reduced. For example, a single vertical deflection amplifier 162 can be used to control the deflection in CRT 130 and its associated monitor CRT 134. A second separate vertical deflection amplifier 164 is used to control the ECG record CRT B132 and its associated monitor CRT 136. Each of the vertical deflection amplifiers 162 and 164 are electrically connected to the summing amplifier 122 to have the composite time division output signal applied thereto.

A single horizontal deflection amplifier 168 is used to control the time ordinance or sweep rate of all four of the CRT's 130–136. By proper adjustment of the D.C. centering circuits 150–156, the electron beams of each CRT can be centered to insure equal deflection in response to the same horizontal deflection amplifier 168.

The vertical deflection amplifiers 162 and 164 and the horizontal deflection amplifier 168 adapted for use with Thomas Electronics Inc. CRT's may be electrostatic deflection amplifiers from Beta Instrumentation Corporation identified as Model EDA–800.

Graticules, generally designated by dashed rectangles 160 and described in U.S. patent application Ser. No. 592,454, filed Nov. 7, 1966 by Creigh et al. may be interpositioned between each of the CRT's 130 and 132 and the camera processor unit 38. By use of such graticules, the resulting ECG waveforms are superimposed onto a reference scale to produce a composite ECG waveform and scale which is imaged onto the photographic media by the camera. Thus, when the imaged photographic media is processed, the resulting image contains calibration waveforms, ECG waveforms and a reference scale for comparison purposes.

The sweep rate or time base of the electron beam and the CRT's 130–136 is determined by a sweep generator 170. The sweep generator in one embodiment was selected to have two sweep rates such as for example 25 mm./sec. and 50 mm./sec. The sweep rate selector 172 which is connected to the sweep generator 170 programs the desired sweep rate. Also, operation of the sweep generator 170 is concurrently controlled by the lead sequencer control 98. The sweep generator 170 is electrically connected to the single horizontal deflection amplifier 168 to simultaneously control the horizontal deflection of each of the CRT's 130–136.

An additional feature which enhances recording of the ECG waveforms by the camera processor unit 38 of FIGURE 3 and which is the subject of a copending application by the present inventors, filed Nov. 12, 1968, will now be described. The 6 channel differentiation circuit 112 differentiates the received ECG signals and applies the differentiated signals to an intensity multiplexer 176. The intensity multiplexer 176 is also controlled by the multiphase clock 116. The intensity multiplexer 176 multiplexes the differentiated signal and applies the same to an intensity modulator 178. The intensity modulator 178 is also electrically connected to and controlled by the multiphase clock 116. The intensity modulator 178 is responsive to the intensity multiplex signal for determining the rise rate of amplitude as a function of time of the ECG signal.

In the absence of the intensity modulator and its associated circuitry, the above-described system is operative. However, if a portion of the ECG signal has a relatively fast rise time, the intensity of the resulting portion of the ECG waveform having the fast rise time is reduced. The intensity is reduced because a larger area of phosphor must be scanned in a given time interval relative to a smaller area of phosphor in response to a portion of a waveform having a relatively low rise time. The "on" time or unblanking interval of the electron beam within the CRT's is controlled in proportion of rate of amplitude change with respect to time. The time interval of resulting light subsequently applied to the recording means, such as for example the camera processor unit 38, and subsequently onto the photographic media, is directly proportional to the "on" time of the electron beam. Thus, the unblanking amplifier improves recording of the ECG waveforms in that the beam intensity for fast rise time is substantially the same as for a slow rise time.

In the preferred embodiment, the intensity modulator 178 by means of unblanking amplifiers 140–146 controls the "on" time of the electron beam in proportion to the amplitude of the differentiated signal. For example, the "on" time of the electron beam is varied from between about 2 microseconds up to a maximum of about 30 microseconds.

In addition to the ECG waveforms, means are provided for concurrently photographing a patient identification number onto the photographic media containing the ECG waveforms. The patient identification number selector 104, which includes the necessary logic, is operatively connected to a patient number record indicator 186 and to a patient number monitor indicator 188. Since the patient identification number selector 104 is operatively connected to the lead sequencer control 98, the recording system logic prevents the recording of ECG waveforms until a patient identification number has been properly entered into the recording system. In this way, for each set of ECG waveforms recorded by the camera processor unit 38 of FIGURE 3, there is an associated patient identification number.

Figure 4:
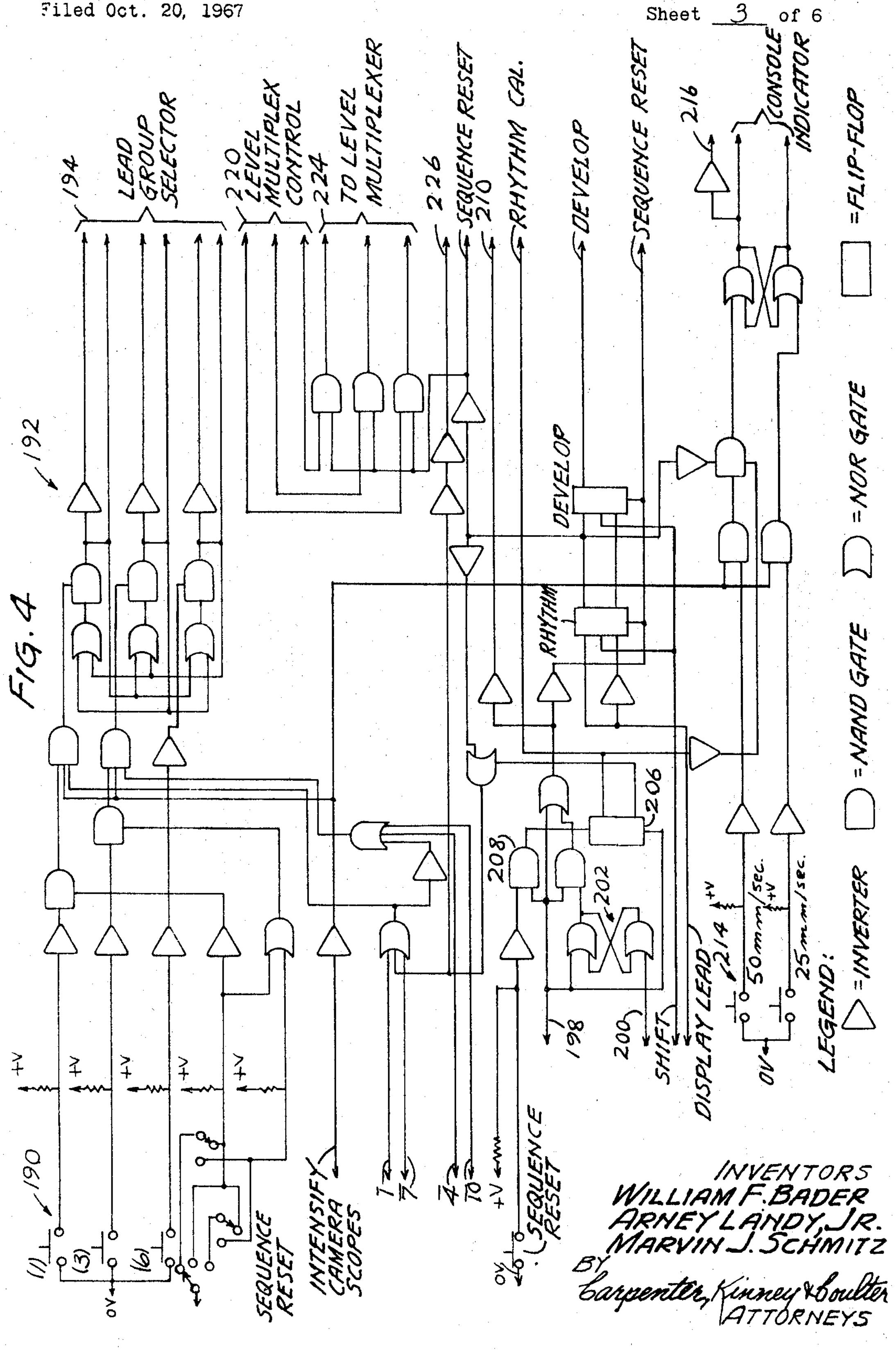
FIGURE 4 is a logic diagram illustrating a sequencer control which programs the operation of the electrocardiographic recording system.

FIGURE 4 illustrates in greater detail the logical operation of the various controls which program operation of the recording system. The lead group selector switch 100 of FIGURE 3 is generally illustrated by switches 190. As is apparent to one skilled in the art, the logic of the circuitry utilizes inverts, NAND gates, NOR gates and flip-flops. When any one of the lead group selector switches 190 is actuated, a negative input signal is applied to the input logic, generally designated as 192, which produces an output signal on one of the leads 194. The output signal on one of the leads 194 is a true or positive voltage representing which of the lead group selector switches is actuated. The lead group selector leads 194 are subsequently applied to input amplifier 96. By use of appropriate NAND gate logic, certain of the 6 simultaneously received channels can be passed as an output from input amplifier 96.

Conductor 198 from the patient identification number selector 104 of FIGURE 3 permits the operator to record ECG waveforms after a complete patient number has been entered. Lead 200 emanates from the expose switch 72 on keyboard 60 of FIGURE 2 and a controlled flip-flop 202 which was previously set by a patient number being entered as represented by lead 198. When flip-flop 202 is reset, and a lead group selector switch 190 has been selected, a flip-flop 206, which is controlled by logic 208, is responsive to the patient number entered flip-flop 202 to permit the camera to record the calibrating waveform by developing a calibrate control voltage on lead 210.

The sweep rate selector 172 of FIGURE 3 is represented by switches 214. When one of the two switches 214 is actuated to select the sweep rate, conductor 216 to the sweep generator 170 of FIGURE 3 presets the sweep rate of the generator for controlling the horizontal deflection amplifier 168.

Conductors 220 are three different voltages from the reference multiplexing control and are used to establish the step voltage which programs the beam deflection of the electron beam within the CRT. The voltages from the reference multiplexing control via conductors 220 are gated with a signal derived from the control flip-flop 206 to produce gating signals for the reference multiplexers over leads 224. Additionally, output 226 is used for controlling the rhythm recording and conditions the signal multiplexing means and the sweep generating means to properly record a complete rhythm waveform.

The remaining leads perform several functions including controlling intensification of the camera scopes, develop and other interlocks, such as for example sequencer reset, display and other interlock controls.

Figure 5:
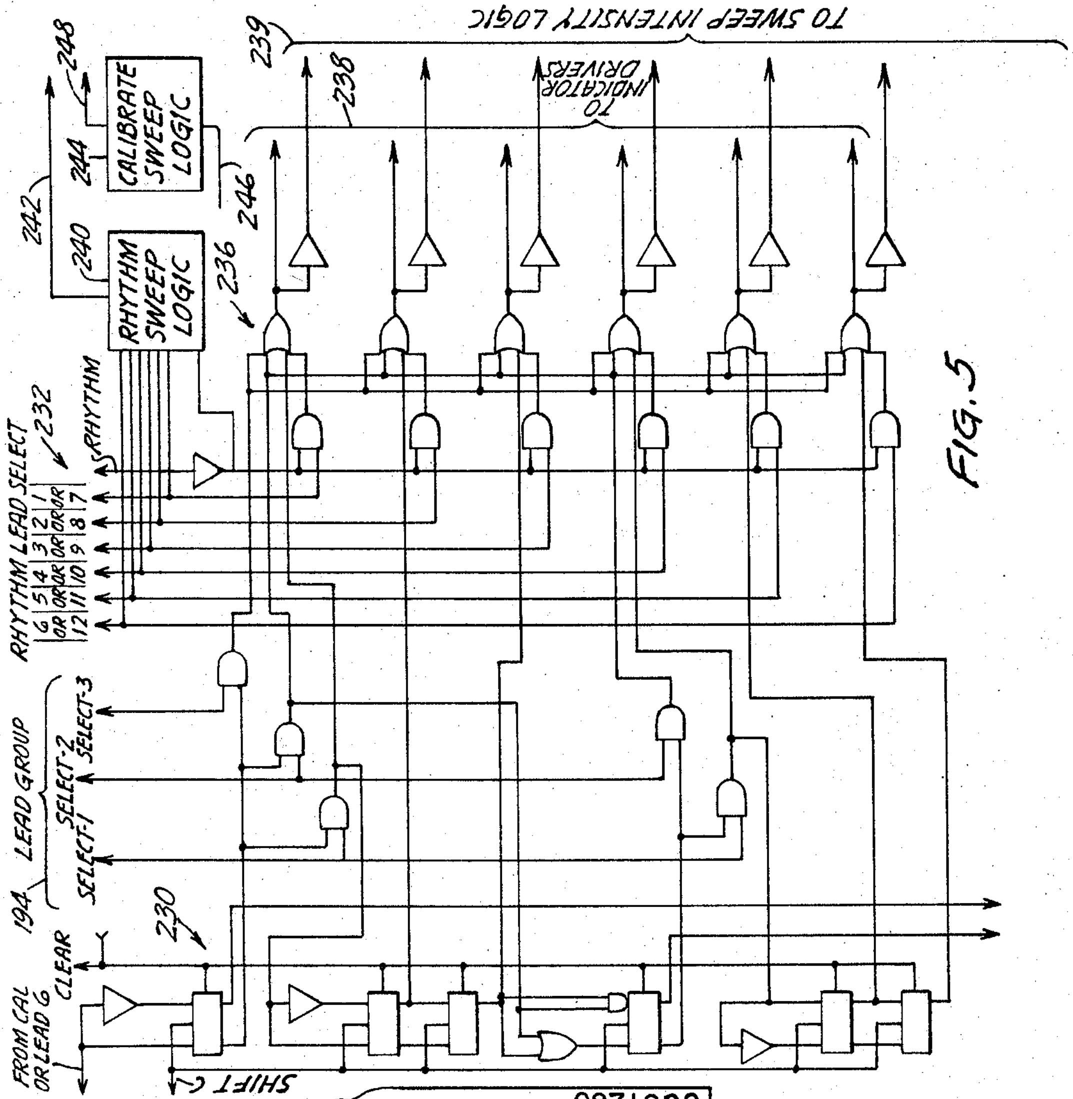
FIGURE 5 is a logic diagram of the sequencer which is controlled by the sequencer control of FIGURE 4 to carry out the programmed operation of the recording system illustrated in FIGURE 3.

FIGURE 5 illustrates the logical circuitry for programming operation of the sweep and intensity logic in response to the lead group selector conductor 194. An input register 230 comprises a plurality of flip-flops which store information on the number of waveforms to be processed and on the waveforms being processed or which have been processed. A second register of 6 flip-flops, which are not shown, is utilized for storing information on the remaining 6 ECG waveforms. Also, one of the conductors 232 will be actuated to indicate which of the channels is selected by the operator to be the rhythm channel. The output from the flip-flop register 230, lead select conductors 194 and rhythm lead select conductors 232 are combined in a logic translator section 236. Two sets of output signals are produced. One set of output signals on conductors 238 is used for driving indicators to visually display on the control console which channel or channels are being processed. The second set of output signals on conductors 239 is applied to the sweep and intensity logic generally shown in FIGURE 3 to control the sweep rate thereof. For example, the 6 channels I, II, III, *a*VR, *a*VL, *a*VF, $V_1$, $V_2$, $V_3$, $V_4$, $V_5$ and $V_6$ are each one-half the length of the rhythm trace. Therefore, output conductors 239 control or program the sweep generator to deflect the electron beam within the CRT a predetermined distance depending on which waveform is being recorded.

In addition to the above logic, a rhythm sweep control designated 240 is operatively connected to the rhythm lead select leads 232 as illustrated in FIGURE 5. The output of the rhythm sweep logic 242 is applied to the sweep and intensity logic to control the sweep duration, which is twice that of a scalar waveform, when the rhythm sweep cycle is actuated. Similarly, a calibrate sweep logic designated as 244 is responsive to a calibrate enable input 246 to produce at an output 248 a calibrate sweep signal which is applied to the sweep and intensity logic to control deflection of the electron beam in the CRT during the calibrate cycle. The calibrate sweep in the preferred embodiment is selected to be one-half centimeter in length. The set of ECG waveforms depicted in FIGURE 9 illustrates the various waveforms noted above.

Figure 6:
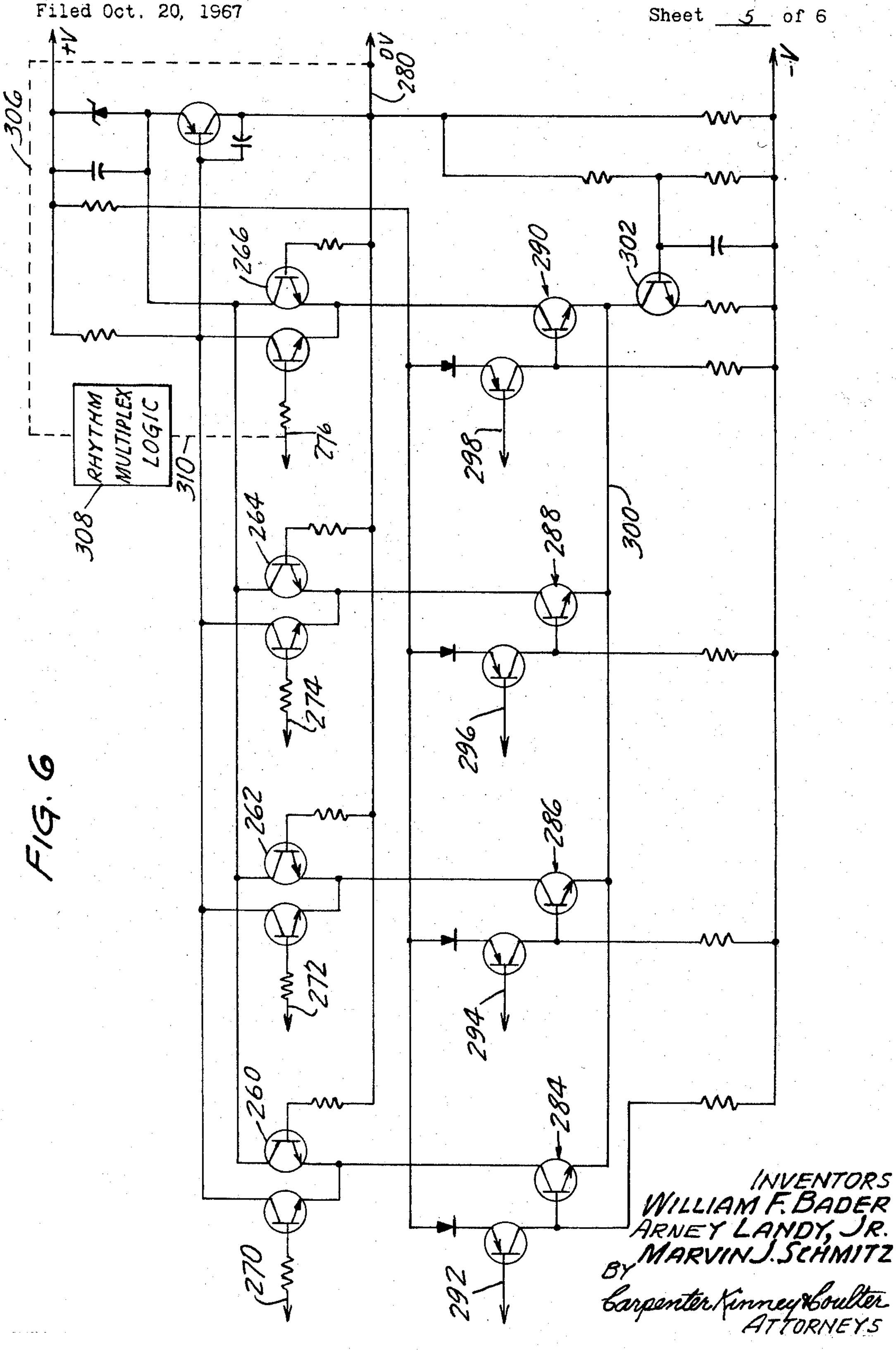
FIGURE 6 is a schematic diagram of a typical four channel multiplexer which is used for each of the multiplexers illustrated in FIGURE 3.

FIGURE 6 is a schematic diagram of a 4 channel signal multiplexer which is used for the multiplexing circuits in one embodiment of the present invention. In one embodiment, a set of two 4 channel multiplexers may be utilized for the signal multiplexer 110 of FIGURE 3. Similarly, sets of two 4 channel multiplexers may be used for the reference multiplexer 118 and for the intensity multiplexer 176, each shown in FIGURE 3.

Briefly, the 4 channel multiplexer comprises 4 transmission gates 260–266 in the form of separate emitter coupled amplifiers each having a gain of one. Inputs 270–276 of the emitter coupled amplifiers 260–266 respectively are capable of receiving electrical signals which are to be multiplexed.

When the 4 channel multiplexer of FIGURE 6 is used as the signal multiplexer, the ECG signals are applied to the inputs 270–276 from the input amplifier 96 via filters 108 of FIGURE 3. The output from each of the amplifiers 260–266 are applied to a common output conductor 280. The resulting signal on output conductor 280 is a multiplexed time division output signal.

The clocking for the generation of the time division output signal is provided by a combination of input drivers and switching transistors generally designated as 284–290. Each of the combination of input drivers and switching stages 284–290 have clocking signals applied to the inputs 292–298 respectively. The clocking signals are developed from a multiphase clock which will be further considered with respect to the discussion of FIGURES 7 and 8A. Each of the switching transistors have the emitters thereof electrically connected to a control lead 300 which is connected to one side of the power supply through a constant current switching device 302.

In normal operation, input drivers and switching stages 284–288 are normally used in sequence for multiplexing ECG signals representing ECG waveforms. However, when a rhythm waveform is to be displayed and recorded, a fourth stage 290 is utilized to give a proper time division output signal for the rhythm waveform. Normally, the rhythm waveform is derived from any one of the other channels. A conductor 306, which is electrically connected to the output conductor 280, is used to form the multiplexed rhythm signal. A rhythm logic control unit 308, which is responsive to a rhythm select conductor 242 of FIGURE 5, permits the time division output signal appearing on conductor 280 to be applied via conductor 306 and a conductor 310 to the input conductor 276 of gate 266. An appropriate rhythm gating signal is applied to input 298 and to the input of the input driver and switching stage selected to be the rhythm waveform at the appropriate time to permit the time division output signal appearing on conductor 280 to be the rhythm waveform.

When the 4 channel multiplexer is used as a reference signal multiplexer, the input to the conductors 270–276 are constant voltage levels and the inputs to conductors 292–298 of the input driver and switching stages are clocking signals. In this situation, the output signal appearing on conductor 280 is a multiplexed timed division output signal having a plurality of different discrete voltage levels. Waveforms of the reference multiplexing signal are illustrated in FIGURE 8B. When the different discrete voltage levels are summed together with the output from the signal multiplexer by the summing amplifier 122 of FIGURE 3, a composite time division output signal is produced containing both a deflection voltage and an amplitude of an ECG signal on a selected channel at the particular time increment or interval.

When the 4 channel multiplexer is used as the intensity multiplexer, the signal applied to inputs 270–276 comprise a differentiated ECG signal while the same clocking signals are those applied to conductors 292–298. Thus, it is apparent that as signals are processed concurrently by the intensity multiplexer, the signal multiplexer and the reference multiplexer, each stage and each operation occurs simultaneously because they are clocked by the same multiphase clock.

Figure 7:
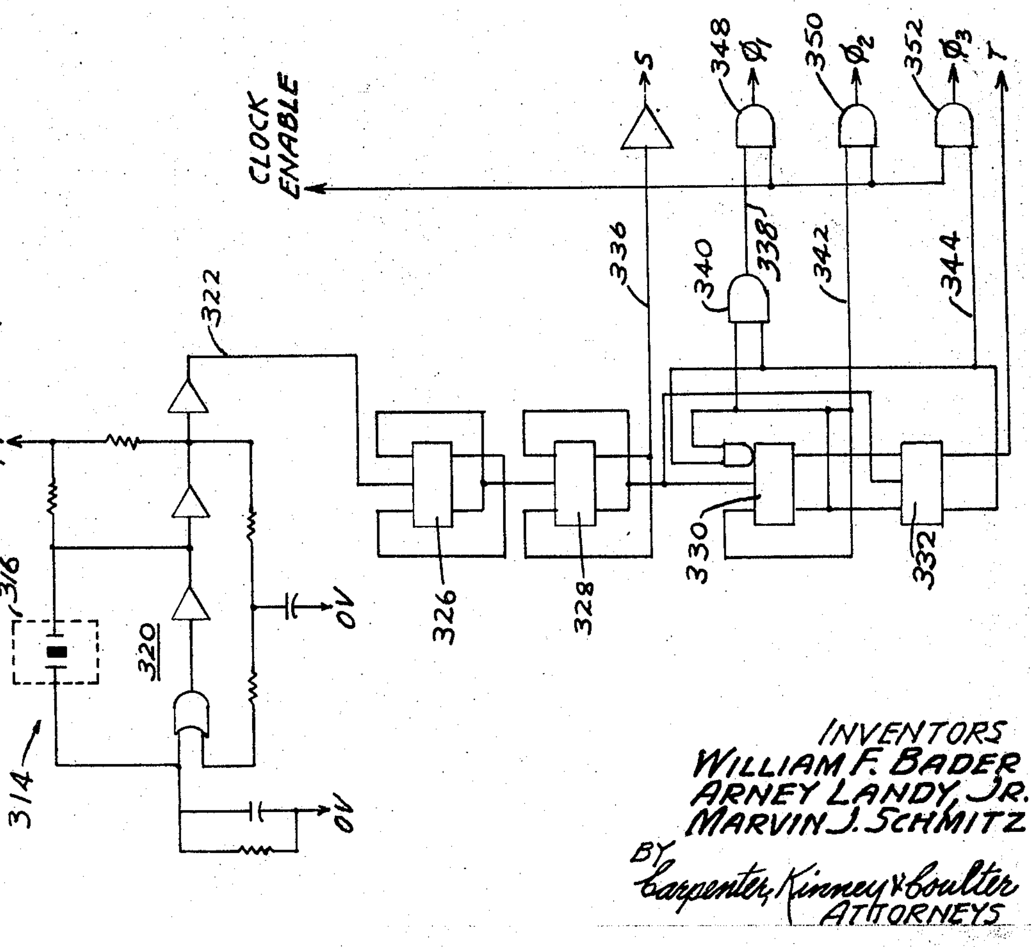
FIGURE 7 is a logic diagram illustrating a multiple phase clock for controlling the multiplexing circuitry of FIGURE 6.

FIGURE 7 is a schematic diagram of the multiplex clock for generating multiphase clocking signals for controlling operation of the multiplexing circuits. Briefly, a basic clock 314 is formed from a crystal 316 together with various logical elements generally designated as 320. In one embodiment, the basic clock 314 is selected to operate at 140 kc. The 140 kc. clocking signal is an output signal on output 322 which is subsequently applied to a frequency division device having a two stage frequency divider comprising flip-flops 326 and 328. Flip-flops 326 and 328 are 2:1 frequency dividers. A first output 336 has a clocking signal having a frequency in the order of 35 kc. The clocking signal on conductor 336 is generally designated as conductor S.

Flip-flops 330 and 332 are used for gating the remaining clock signals. A second clocking output 338 is developed from the flip-flop 330 via a NAND gate 340. The inputs to NAND gate 340 are also used for two other clocking signals which are developed on conductors 342 and 344. The clocking signals appearing on conductors 338, 342 and 344 have the same frequency but are out of phase with respect to each other. A clock enable control 346 together with NAND gates 348, 350 and 352, which are connected to clocking conductors 338, 342 and 344 respectively, control the generation of the multiphase clock signals. The output of NAND gate 348 is designated as $\phi_1$, from 350 as $\phi_2$ and from 352 as $\phi_3$. A fifth clocking conductor 354, which is identified as output T, provides a clocking signal which is inverted with respect to signal $\phi_3$. Each of the clocking signals on outputs $\phi_1$, $\phi_2$ and $\phi_3$ has a frequency of 11.7 kc. but are shifted in phase relative to each other. This relationship can be easily seen by reference to FIGURE 8A.

The graph of FIGURE 8A illustrates the waveforms of the clocking signals appearing on outputs S, $\phi_1$, $\phi_2$, $\phi_3$ and T. Waveform S is a 35 kc. signal as indicated hereinbefore. Considering a normal multiplexing operation, a total of 90 $\mu$sec. or three S cycles are required to complete one multiplex sequence. Thus, in 90 $\mu$sec., a time division multiplex sequence can be completed. Waveform $\phi_1$ enables the various multiplexers for the first 30 $\mu$sec. and remains "off" for the next 60 $\mu$sec. Waveform $\phi_2$ has a 30 $\mu$sec. "off" time, 30 $\mu$sec. "on" time and then a 30 $\mu$sec. "off" time. Waveform $\phi_3$ has a 60 $\mu$sec. "off" time and a 30 $\mu$sec. "on" time. Thus, during the 90 $\mu$sec. time division sequence, clocking signals $\phi_1$, $\phi_2$ and $\phi_3$ normally control the operation of the multiplexers. However, when a rhythm sequence is to be displayed and photographed, a separate control rhythm logic 308 enables the fourth channel of the multiplexers. The waveforms S and T are utilized to control the other elements within the circuitry, such as for example the intensity modulator 178.

The graph of FIGURE 8B illustrates the reference multiplexing signals generated from a reference signal multiplexer which is summed together with the output from the signal multiplexer 110 of FIGURE 3. Each 30 $\mu$sec. time increment of the reference signal represents a predetermined voltage which functions to position an electron beam within the CRT at a predetermined position on the tube. Thus, each of the reference signals represent a different discrete waveform section of a different ECG waveform. The total length of the resulting waveform is, of course, programmed to cover approximately one-half of the CRT face. When the voltage of a reference signal is added with the voltage of a time increment of the time division output signal for the same 30 $\mu$sec. time interval, the reference multiplex signal is used to position the electron beam at a predetermined location on the CRT face while the ECG signal information is utilized as the amplitude of the ECG waveform at that predetermined time interval. Thus, the electron beam within the CRT is deflected at a predetermined rate representing the time base of the ECG waveform. The composite time division output signal, comprising a plurality of waveform sections, are located at different discrete places on the CRT surface. Since the multiplexing occurs at a relatively high rate, visually the resulting ECG waveform sections produced by the deflected electron beam appears as a plurality of continuous ECG waveforms.

FIGURE 9 is a pictorial representation of a set of ECG waveforms which have been recorded using the teachings of the present invention. Generally, the ECG waveforms I, II, III, $V_1$, $V_2$ and $V_3$ are displayed on the ECG waveform CRT A designated as CRT 130 in FIGURE 3.

The calibrate waveform which appears on each of the channels I, II, III, *a*VR, *a*VL and *a*VF are designated as 360. After the calibrate waveform has been photographed by the camera processor unit, the selected number of channels, namely 1, 3 or 6, can then be photographed simultaneously. In channel I, an ECG waveform designated as 362 covers one-half of the face of the CRT. The remaining 11 scaler ECG waveforms cover only one-half of a CRT face. The rhythm waveform, designated as R*h*, covers the entire lower portion of a CRT face. The rhythm waveform is approximately twice the length of any one of the earlier photographed 12 ECG waveforms.

As noted hereinbefore, any one of the 12 channels can be selected as the rhythm lead. A patient identification number, which is shown as 0001260 in FIGURE 9, identifies the patient whose ECG is recorded on microfilm. In addition, patient data can be noted in area 364 which is located between the waveform pair III and $V_3$ and the waveform pair *a*VR and $V_4$. Further, system information can be recorded in area 368. Additionally, since an operator can select the gain level and sweep rate, indicating means are provided to indicate the settings for each of the recorded ECG's. For example, the two located above $V_1$ indicate that the gain setting was on 2 rather than the normal setting of 1. Also, if the sweep rate is set at 50 mm./sec., this would be shown below the $V_1$ indicating a setting which is other than a standrad setting.

It is readily apparent that after a patient's ECG signals are permanently recorded on the aperture card that the aperture card can be easily stored. This provides a greater advantage over the prior art wherein pieces of a strip chart must be selected from a strip of patterns and individually placed on bulky strip sheets. The image on the aperture card quadrant can be easily projected to a relatively large print and then be copied by means of known reader printers. In this way, a cardiologist can be provided with a waveform for analysis purposes which is the same size as that from standard ECG strip records. Also, the cardiologist is provided with calibration waveforms, the gain settings and sweep rates for diagnosis purposes.

Further, other diagnosis information, such as for example computer data and a computer generated diagnosis, can be conveniently photographed from other CRT's. This information can be located on a quadrant adjacent to the quadrant containing the ECG waveforms in the same card.

Also, it is contemplated that the aperture card could be punched using known codes to provide a means for storing desired information which can be retrieved from punched cards.

What is claimed is:

1. A method for recording electrocardiographic signals as electrocardiographic waveforms on a photographic medium comprising the steps of generating calibration signals which are capable of producing a calibration waveforms adapted for use as a reference for analyzing said electrocardiographic waveforms;

simultaneously generating a plurality of analog electrocardiographic signals over a plurality of electrical channels wherein each channel contains an electrocardiographic signal representing an electrocardiographic waveform;

transmitting said calibration signals and said electrocadiographic signals in a predetermined sequence over a plurality of channels to an input means;

amplifying the received calibration signals and said electrocardiographic signals within said input means;

multiplexing the amplified calibration signals and said electrocardiographic signals to produce a time division output signal on a single channel wherein predetermined time increments of said time division output signal contain calibration signal information and different electrocardiographic signal information;

summing said time division output signal with reference multiplexing signals which represent different discrete waveform sections to produce a composite time division output signal;

displaying in response to said composite time division output signal calibration waveforms representing said calibration signals and a plurality of electrocardiographic waveforms representing said analog electrocardiographic signals; and imaging said photographic medium with said calibration waveforms and said electrocardiographic waveforms.

2. The method of claim 1 wherein said photographic medium is a 35 mm. frame in an aperture card and one quadrant thereof is imaged with said calibration waveform and said electrocardiographic waveforms, said method further comprising the step of processing said imaged aperture card to produce a permanent record of said calibration waveform and said electrocardiographic waveforms.

3. A method for displaying electrocardiographic waveforms comprising the steps of simultaneously generating a plurality of analog electrocardiographic signals over a plurality of electrical channels wherein each channel contains an electrocardiographic signal representing an electrocardiographic waveform;

transmitting said electrocardiographic signals in a predetermined sequence over a plurality of channels to an input means;

amplifying the received electrocardiographic signals within said input means;

multiplexing the amplified electrocardiographic signals to produce a time division output signal on a single channel wherein predetermined time increments of said time division output signal contain different electrocardiographic signal information;

multiplexing a source of discrete voltage levels which represent different discrete waveform sections to produce reference multiplexing signals;

summing said time division output signal with said reference multiplexing signals to produce a composite time division output signal; and displaying in response to said composite time division output signal a plurality of electrocardiographic waveforms representing said analog electrocardiographic signals.

4. An electrocardiographic system capable of displaying analog electrocardiographic signals as electrocardiographic waveforms, said system comprising a plurality of electrical channels each of which contains an analog electrocardiographic signal representing an electrocardiographic waveform;

input means operatively coupled to each of said electrical channels for simultaneously amplifying said electrocardiographic signals;

a signal multiplexing means operatively connected to said input means for simultaneously receiving each of said amplified electrocardiographic signals and for producing in response to clocking signals a time division output signal comprising a predetermined number of equal time increments each of which contains electrocardiographic signal information from a different electrocardiographic waveform;

clocking means including a multiphase clock operatively coupled to said signal multiplexing means, said multiphase clock producing a plurality of clocking signals having a predetermined frequency and different preselected phases for controlling said signal multiplexing means;

reference signal multiplexing means operatively coupled to said clocking means and responsive to said clocking means and responsive to said clocking signals for producing a plurality of reference multiplexing signals each of which represents a different discrete waveform section of a different electrocardiographic waveform;

summing means operatively coupled to said signal multiplexing means and said reference signal multiplexing means for summing said time division output signal with said reference multiplexing signal producing a composite time division output signal on a single channel wherein each time increment electrocardiographic signal information is programmed with a predetermined waveform section;

sweep generating means for generating sweep signals representing the time base of an electrocardiographic waveform; and waveform generating means responsive to said composite time division output signal and said sweep signals for displaying a plurality of electrocardiographic waveforms each of which has an amplitude determined by said time increment electrocardiographic signal information and the time base of which is determined by the sweep signals, said waveform generating means being operative to generate and display each waveform section from said composite time division output signal whereby each waveform section results in a plurality of separate electrocardiographic waveforms wherein each waveform represents electrocardiographic signals from a selected channel.

5. The electrocardiographic system of claim 4 for recording said electrocardiographic waveforms on a photographic medium, said system comprising recording means including said photographic medium positioned relative to said waveform generating means for imaging said photographic medium with said plurality of electrocardiographic waveforms representing said electrocardiographic signals.

6. The electrocardiographic recording system of claim 2 wherein said recording means is adapted to image one quadrant of a 35 mm. aperture card with a standard set of scalar lead waveforms identified as I, II, III, *a*VR, *a*VL, *a*VF, $V_1$, $V_2$, $V_3$, $V_4$, $V_5$ and $V_6$ and a rhythm waveform selected from one of said standard scalar lead waveforms.

7. The electrocardiographic recording system of claim 5 further comprising programming means operatively coupled to said input means for selecting a predetermined number of channels from the total number of channels which are to be simultaneously imaged on said photographic medium as electrocardiographic waveforms and for selecting which of said channels is to be a rhythm waveform.

8. The electrocardiographic system of claim 4 wherein said waveform generating means includes at least two cathode ray tubes wherein an electron beam is deflected on a phosphor faceplate to produce light images and which in combination display a standard set of scalar lead waveforms and a rhythm waveform capable of being photographed by a camera processor unit, said system further comprising first and second vertical deflection amplifiers each of which is operatively connected to one of said cathode ray tubes, said first and second deflection amplifiers being electrically connected to said summing means for receiving said composite time division output signal and for deflecting said electron beam in its associated cathode ray tube a distance equal to the amplitude of an electrocardiographic waveform section for each time increment of said composite time division output signal; and a horizontal deflection amplifier operatively connected to each of said cathode ray tubes, said horizontal deflection amplifier being operatively connected to said sweep generating means for simultaneously deflecting each of said electron beams in response to said sweep signals for establishing a time base for said electrocardiographic waveforms.

9. The electrocardiographic system of claim 8 further comprising first and second direct current centering circuits one of which is operatively coupled to each of said cathode ray tubes, said direct current centering circuits being capable of positioning each of said electron beams within each of said cathode ray tubes at centering points wherein the deflections and time bases of each electron beam are synchronized in response to said sweep signals.

10. The electrocardiographic system of claim 9 further comprising first and second monitor cathode ray tubes wherein an electron beam is deflected on a phosphor faceplate to produce light images, said first and second monitor cathode ray tubes being operatively connected to said first and second vertical deflection amplifiers respectively and to said horizontal deflection amplifier for simultaneously displaying the electrocardiographic waveform being displayed on and photographed from said two cathode ray tubes.

11. The electrocardiographic system of claim 10 further comprising third and fourth direct current centering circuits operatively connected to said first and second monitor cathode ray tubes respectively, said direct current centering circuits being capable of positioning said electron beam within each of said monitor cathode ray tubes at centering points wherein the deflections and time bases of each electron beam are synchronized in response to said sweep signals.

12. A system for recording electrocardiographic waveforms on a photographic medium, said system being capable of utilizing standard electrocardiographic electrodes and amplifiers for simultaneously producing analog electrodes and amplifiers for simultaneously producing analog electrocardiographic signals over a plurality of electrical channels, said system comprising a calibration circuit operatively connected to said electrocardiographic amplifier for generating and applying a calibration signal representing a calibration waveform on a predetermined number of the same electrical channels which are to transmit analog electrocardiographic signals;

communication means operatively connected to said electrocardiographic amplifier for transmitting said calibration signals and said electrocardiographic signals;

input amplifying means operatively connected to said communication means for receiving said calibration signals and said electrocardiographic signals;

multiplexing means operatively connected to said input amplifying means for simultaneously receiving said amplified calibration signals and a plurality of channels of electrocardiographic signals, said multiplexing means including means for producing in response to clocking signals a time division output signal comprising a predetermined number of time increments each of which contains electrocardiographic signal information and for summing said time division output signals with a reference multiplexing signal representing different discrete waveform sections of said calibration and said electrocardiographic waveforms to produce a composite time division output signal on a single channel;

sweep generating means for generating sweep signals representing a time base of an electrocardiographic waveform;

waveform generating means responsive to said composite time division output signal and said sweep signals for displaying calibration waveforms in response to calibration signal information and electrocardiographic waveforms in response to electrocardiographic signal information; and a camera processing unit positioned relative to said waveform generating means for imaging a photographic medium with said waveforms displayed by said waveform generating means and for processing said imaged photographic medium to produce a permanent record of said calibration signal waveforms and said electrocardiographic waveforms on said photographic medium.

13. Apparatus for displaying and recording electrocardiographic waveforms in response to electrocardiographic signals, said apparatus comprising an input amplifier adapted to receive said electrocardiographic signals over a plurality of electrical channels for simultaneously amplifying said electrocardiographic signals;

a lead sequencer circuit including circuitry for programming said apparatus to simultaneously record a predetermined number of said electrocardiographic waveforms and for recording said electrocardiograph waveforms in groups comprising said predetermined number of waveforms until all of said electrocardiographic signals are recorded, said lead sequencer circuit being capable of programming which one of said electrocardiographic signals is recorded separately as a rhythm waveform;

a signal multiplexing circuit operatively connected to said input amplifier for simultaneously receiving each of said amplified electrocardiographic signals and for producing in response to clocking signals to time division output signals comprising a predetermined number of time increments each of which has a voltage level representing electrocardiographic signal information;

a multiphase clock operatively coupled to said signal multiplexing circuit, said multiphase clock producing a plurality of clocking signals having a predetermined frequency and different preselected phases for controlling said signal multiplexing circuit;

a reference signal multiplexing circuit operatively coupled to said multiphase clock for receiving the same clocking signals as said signal multiplexing circuit, said reference signal multiplexing circuit producing a plurality of discrete voltage levels as reference multiplexing signals;

a summing amplifier operatively connected to said signal multiplexing circuit and said reference signal multiplexing circuit for summing voltages representing said electrocardiographic signal information with voltages representing said reference multiplexing signals to produce a resultant voltage representing a composite time division output signal;

a sweep generator for generating a sweep voltage representing a time base for said electrocardiographic waveforms;

first and second vertical deflection amplifiers operatively connected to said summing amplifier for producing first and second vertical deflection voltages representing different electrocardiographic waveform sections;

a horizontal deflection amplifier operatively coupled to said sweep generator for generating a horizontal deflection voltage representing said time base of said electrocardiographic waveform;

first and second cathode ray tubes operatively connected to said first and second vertical deflection amplifiers respectively and to said horizontal deflection amplifier, said cathode ray tubes being responsive to said first and second vertical deflection voltages and to said horizontal deflection voltage for displaying a plurality of waveform sections which visually appear as a plurality of separate electrocardiographic waveforms;

first and second graticules positioned in alignment with said first and second cathode ray tubes respectively for superimposing said electrocardiographic waveforms onto a reference scale for producing composite electrocardiographic waveforms having a reference scale; and a camera positioned relative to said first and second granticules for imaging a photographic medium with said composite electrocardiographic waveforms having a reference scale.

References Cited

Design of a Centralized Electrocardiographic and Vectorcardiographic System; The American Journal of Cardiology; vol. 19, June 1967, pp. 818–826.

RICHARD B. WILKINSON, *Primary Examiner.*
JOSEPH W. HARTARY, *Assistant Examiner.*

U.S. Cl. X.R.

128—2.06; 178—6.7; 179—2; 346—34, 110

UNITED STATES PATENT OFFICE
CERTIFICATE OF CORRECTION

Patent No. 3,434,151

March 18, 1969

William F. Bader et al.

It is certified that error appears in the above identified patent and that said Letters Patent are hereby corrected as shown below:

Column 1, line 21, "dervied" should read -- derived --; line 65, "withing" should read -- within --. Column 2, line 7, "respnse" should read -- response --; line 15, "recrded" should read -- recorded --. Column 4, line 16, "relates" should read -- relate --. Column 7, line 72, "kHz" should read -- KHz --. Column 9, line 20, "of" should read -- to --; line 57, "inverts" should read -- inverters --. Column 10, line 29, "conductor" should read -- conductors --; line 46, "6 channels" should read -- 12 waveforms --. Column 11, line 50, "timed" should read -- time --. Column 13, line 11, "scaler" should read -- scalar --; line 30, "standrad" should read -- standard --; line 50, after "same" insert -- aperture --; line 69, "cadiographic" should read -- cardiographic --. Column 15, line 1, cancel "means and responsive to said clocking". Column 16, lines 39 to 41 cancel "electrodes and amplifiers for simultaneously producing analog". Column 17, line 33, "to" should read -- a --; same line 33, "signals" should read -- signal --. Column 18, line 34, "granticules" should read -- graticules --.

Signed and sealed this 7th day of April 1970.

(SEAL)
Attest:

EDWARD M.FLETCHER,JR.
Attesting Officer

WILLIAM E. SCHUYLER, JR.
Commissioner of Patents